(12) United States Patent
Minami

(10) Patent No.: US 12,297,084 B2
(45) Date of Patent: May 13, 2025

(54) WORK MACHINE CONTROL SYSTEM AND CRANE

(71) Applicant: TADANO LTD., Kagawa (JP)

(72) Inventor: Yoshimasa Minami, Kagawa (JP)

(73) Assignee: TADANO LTD., Kagawa (JP)

( * ) Notice: Subject to any disclaimer, the term of this patent is extended or adjusted under 35 U.S.C. 154(b) by 392 days.

(21) Appl. No.: 17/777,911

(22) PCT Filed: Dec. 24, 2020

(86) PCT No.: PCT/JP2020/048541
§ 371 (c)(1),
(2) Date: May 18, 2022

(87) PCT Pub. No.: WO2021/132507
PCT Pub. Date: Jul. 1, 2021

(65) Prior Publication Data
US 2022/0411233 A1   Dec. 29, 2022

(30) Foreign Application Priority Data

Dec. 27, 2019   (JP) .................................. 2019-238334

(51) Int. Cl.
*B66C 13/06*      (2006.01)
*B66C 13/22*      (2006.01)
(Continued)

(52) U.S. Cl.
CPC ............ *B66C 13/063* (2013.01); *B66C 13/22* (2013.01); *B66C 13/46* (2013.01); *B66C 13/48* (2013.01);
(Continued)

(58) Field of Classification Search
CPC ....... B66C 13/063; B66C 13/22; B66C 13/46; B66C 13/48; B66C 13/20; B66F 9/24; G05B 13/02; G05D 3/12
See application file for complete search history.

(56) References Cited

U.S. PATENT DOCUMENTS 9,856,118 B1 *   1/2018   Lin ......................... B66C 13/46
2007/0052579 A1 *   3/2007   Furukawa ............. G01S 7/2923
                                                    342/195
(Continued)

FOREIGN PATENT DOCUMENTS

JP   H07-081876 A    3/1995
JP   2008-305064 A   12/2000
(Continued)

OTHER PUBLICATIONS

Mar. 30, 2021, International Search Report issued for related PCT application No. PCT/JP2020/048541.
(Continued)

*Primary Examiner* — Sohana Tanju Khayer
(74) *Attorney, Agent, or Firm* — Paratus Law Group, PLLC

(57) ABSTRACT

This control system comprises: a signal processing unit generating a signal related to the target operating amount of an actuator; a feedback control unit that controls the actuator based on the difference between the signal related to the target operating amount and a signal related to the fed-back operating amount; a feed-forward control unit that controls the actuator based on the signal related to the target operating amount in cooperation with the feedback control unit, and learns the characteristics of the actuator by adjusting a weighting factor based on a teacher signal; and a calculation unit that calculates information related to the deflection of the work machine. The signal processing unit corrects intermediate information, which is generated in the process (Continued)

of generating the signal related to the target operating amount, based on the information related to the deflection, and generates the signal related to the target operating amount.

5 Claims, 11 Drawing Sheets

(51) Int. Cl.
  *B66C 13/46* (2006.01)
  *B66C 13/48* (2006.01)
  *B66F 9/24* (2006.01)
  *G05B 13/02* (2006.01)
  *G05D 3/12* (2006.01)

(52) U.S. Cl.
  CPC ............... *B66F 9/24* (2013.01); *G05B 13/02* (2013.01); *G05D 3/12* (2013.01)

(56) References Cited

U.S. PATENT DOCUMENTS

| | | | |
|---|---|---|---|
| 2014/0299564 A1* | 10/2014 | Lin | B66C 13/06 33/343 |
| 2015/0012188 A1 | 1/2015 | Scheider et al. | |
| 2015/0353329 A1* | 12/2015 | Lin | B66C 13/16 33/333 |
| 2018/0167588 A1* | 6/2018 | Izumikawa | E02F 3/40 |
| 2019/0084809 A1* | 3/2019 | Claeys | B66C 23/90 |
| 2019/0224846 A1* | 7/2019 | Pivac | B28D 1/186 |
| 2020/0327403 A1* | 10/2020 | Du | G02B 27/12 |
| 2021/0262196 A1* | 8/2021 | Ito | E02F 9/205 |

FOREIGN PATENT DOCUMENTS

| | | |
|---|---|---|
| JP | 2010-228905 A | 10/2010 |
| JP | 2018092279 A * | 6/2018 |
| JP | 2019-094177 A | 6/2019 |
| WO | WO 2017/159319 A1 | 9/2017 |

OTHER PUBLICATIONS

Mar. 30, 2021, International Search Opinion issued for related PCT application No. PCT/JP2020/048541.

* cited by examiner

WORK MACHINE CONTROL SYSTEM AND CRANE

CROSS REFERENCE TO PRIOR APPLICATION

This application is a National Stage Patent Application of PCT International Patent Application No. PCT/JP2020/048541 (filed on Dec. 24, 2020) under 35 U.S.C. § 371, which claims priority to Japanese Patent Application No. 2019-238334 (filed on Dec. 27, 2019), which are all hereby incorporated by reference in their entirety.

TECHNICAL FIELD

The present invention relates to a work machine control system and a crane.

BACKGROUND ART

Conventionally, in mobile cranes or the like, there has been known a crane in which each of actuators is operated by an operation terminal or the like. Such a crane is operated by an operation command signal on the basis of a load from the operation terminal, and thus, an operator can intuitively operate each of the actuators without being conscious of an operating speed, an operating amount, an operating timing, and the like of each of the actuators (see Patent Literature 1).

A crane described in Patent Literature 1 acquires a speed signal related to an operation speed of an operation tool and a direction signal related to an operation direction from an operation terminal. Thus, at a start or stop of movement at which the speed signal from the operation terminal is input in the form of a step function, discontinuous acceleration sometimes occurs to cause swinging of a load. Therefore, a technique is known in which a crane is controlled according to a speed signal that achieves positioning of the crane at a target position and minimization of a swing angle of a load by performing optimal control to feed back a speed and a position of a crane and a swing angular speed and the swing angle of the load and compensation of a lag using a predictive gain (see Patent Literature 2).

The crane described in Patent Literature 2 is controlled on the basis of a predetermined mathematical model of the crane so as to improve the positioning accuracy of the crane and minimize the swinging of the load. Therefore, in a case where the mathematical model has a large error, an error of a future predictive value also becomes large, which causes disadvantages of a decrease of the positioning accuracy of the crane and an increase of the swinging of the load In particular, in a mobile crane having an elongation/contraction boom, the positioning accuracy of the crane is sometimes affected by a deflection amount of the boom.

CITATION LIST

Patent Literature

Patent Literature 1: JP 2010-228905 A
Patent Literature 2: JP H7-81876 A

SUMMARY OF THE INVENTION

Problems to be Solved by the Invention

An object of the present invention is to provide a work machine control system and a crane capable of controlling an actuator while considering influence of a deflection of a work machine.

Solutions to Problems

An aspect of a work machine control system of a work machine according to the present invention is a control system that controls an actuator of a work machine having a boom, and includes: a signal processing unit that generates a signal related to a target operating amount of the actuator from an input signal; a feedback control unit that controls the actuator on the basis of a difference between the signal related to the target operating amount and a signal related to a fed-back operating amount of the actuator; a feed-forward control unit that controls the actuator on the basis of the signal related to the target operating amount in cooperation with the feedback control unit, and learns characteristics of the actuator by adjusting a weighting factor on the basis of a teacher signal; and a calculation unit that calculates information related to a deflection of the work machine. The signal processing unit corrects intermediate information, which is generated in the process of generating the signal related to the target operating amount, on the basis of the information related to the deflection obtained from the calculation unit, and generates the signal related to the target operating amount.

An aspect of a crane according to the present invention is equipped with the above-described control system.

Effects of the Invention

According to the present invention, it is possible to provide the work machine control system and the crane capable of controlling the actuator while considering the influence of the deflection of the work machine.

DESCRIPTION OF EMBODIMENTS

Embodiment

Hereinafter, a crane 1 will be described as a work machine according to an embodiment of the present invention with reference to FIGS. 1 and 2. The crane 1 is a mobile crane (rough terrain crane). Note that the crane 1 (rough terrain crane) will be described as the work machine in the present embodiment, the work machine may be an all-terrain crane, a truck crane, a loading truck crane, or the like. In addition, the present invention is also applicable to a working device for suspending a load with a wire rope. In addition, the work machine is not limited to the crane, and may be a work machine (for example, an aerial work platform) having a boom.

In the following description, "(n), (n+1), and (n+2)" mean pieces of information acquired for the nth time, the (n+1)th time, and the (n+2)th time, respectively, among pieces of information (for example, a fed-out amount of the wire rope) acquired every unit time t. That is, "(n)" means information acquired after a lapse of n×unit time t since the start of information acquisition. In addition, "(n+1)" means information acquired after a lapse of (n+1)×unit time t since the start of information acquisition. In addition, "(n+2)" means information acquired after a lapse of (n+2)×unit time t since the start of information acquisition. Note that "x" means multiplication.

Figure 1:
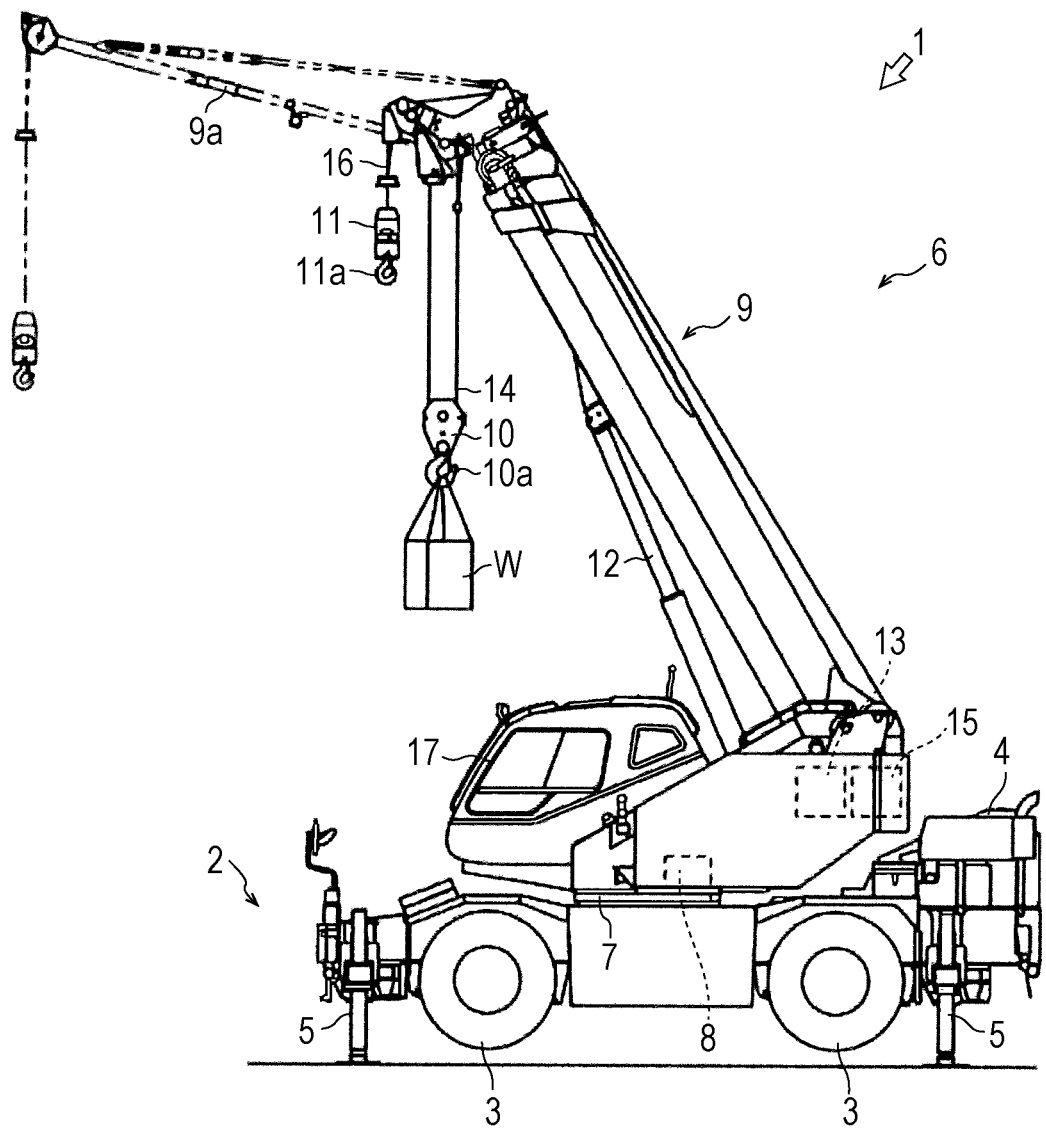
FIG. 1 is a side view illustrating an overall configuration of a crane.

As illustrated in FIG. 1, the crane 1 is the mobile crane that can move co an unspecified place. The crane 1 includes a vehicle 2, a crane device 6 which is a working device, and a load moving operation tool 32 (see FIG. 2) which can operate the crane device 6 on the basis of a load W.

The vehicle 2 is a traveling body that carries the crane device 6. The vehicle 2 has a plurality of wheels 3 and travels with an engine 4 as a power source. The vehicle 2 is provided with an outrigger 5. The outrigger 5 is constituted by a projecting beam that can be hydraulically extended on both sides in a width direction of the vehicle 2 and a hydraulic jack cylinder that can be extended in a direction perpendicular to the ground.

The vehicle 2 can expand an operable range of the crane 1 by extending the outrigger 5 in the width direction of the vehicle 2 and grounding the lack cylinder.

The crane device 6 is the working device that lifts the load W with the wire rope. The crane device 6 includes a turning base 7, a boom 9, a jib 9a, a main hook block 10, a sub hook block 11, a raising hydraulic cylinder 12, a main winch 13, a main wire rope 14, a sub winch 15, a sub wire rope 16, a cabin 17, and the like.

The turning base 7 is a driving device that allows the crane device 6 to turn. The turning base 7 is provided on a frame of the vehicle 2 via an annular bearing. The turning base 7 is configured to be rotatable about a central axis of the annular bearing as a center of rotation.

The turning base 7 is provided with a hydraulic turning hydraulic motor 8 which is an actuator. The turning base 7 is configured to be capable of turning in one direction and the other direction by the turning hydraulic motor 8.

Turning base cameras 7b (see FIG. 2), which are load position detection units, are monitoring devices that capture images of an obstacle, a person, and the like around the turning base 7. The turning base cameras 7b are provided on both left and right sides in front of the turning base 7 and on both left and right sides behind the turning base 7.

Each of the turning base cameras 7b covers the entire periphery of the turning base 7 as a monitoring range by capturing an image of the periphery of each installation location. In addition, the turning base cameras 7b arranged on both the left and right sides in front of the turning base 7 are configured to be usable as a set of stereo cameras.

That is, the turning base cameras 7b in front of the turning base 7 can be configured as the load position detection units that detect position information of the suspended load W by being used as the set of stereo cameras.

Note that the load position detection unit may include a boom camera 9b to be described later. In addition, the load position detection unit is preferably a unit that can detect the position information of the load W such as a millimeter wave radar, an acceleration sensor, or a GNSS.

The turning hydraulic motor 8 is an actuator that is rotationally operated by a turning valve 23 (see FIG. 2) which is an electromagnetic proportional switching valve. The turning valve 23 can control a flow rate of hydraulic oil supplied to the turning hydraulic motor 8 to any flow rate.

In other words, the turning base 7 is configured to be controllable to any turning speed via the turning hydraulic motor 8 rotatably operated by the turning valve 23. The turning base 7 is provided with a turning sensor 27 (see FIG. 2) that is turning angle detection unit for detecting a turning angle θz (see FIG. 4) and a turning speed of the turning base 7.

The boom 9 is a movable prop that supports the wire rope to a state of being capable of lifting the load W. The boom 9 includes a plurality of boom members. The boom 9 is provided such that a proximal end of a base boom member is swingable substantially at the center of the turning base 7.

The boom 9 is configured to be freely elongated/contracted in the axial direction by moving each boom member by an elongation/contraction hydraulic cylinder (not illustrated) which is an actuator. In addition, the boom 9 is provided with the jib 9a.

The elongation/contraction hydraulic cylinder (not illustrated) is the actuator that is operated to be elongated/contracted by an elongation/contraction valve 24 (see FIG. 2) which is an electromagnetic proportional switching valve. The elongation/contraction valve 24 can control a flow rate of hydraulic oil supplied to the elongation/contraction hydraulic cylinder to any flow rate.

The boom 9 is provided with an elongation/contraction sensor 28 which is an elongation/contraction length detection unit that detects a length of the boom 9, and an azimuth sensor 29 that detects an azimuth with on the tip of the boom 9 as a center.

The boom camera 9b (see FIG. 2) is a sensing device that captures images of the load W and features in the vicinity of the load W. The boom camera 9b is provided at the tip of the boom 9. The boom camera 9b is configured to be capable of capturing images of the load W and features or terrain in the vicinity of the crane 1 from vertically above the load W.

The main hook block 10 and the sub hook block 11 are suspenders for suspending the load W. The main hook block 10 is provided with a plurality of hook sheaves around which the main wire rope 14 is wound, and a main hook 10a for suspending the load W. The sub hook block 11 is provided with a sub hook 11a for suspending the load W.

The raising hydraulic cylinder 12 is an actuator that raises and lowers the boom 9 and holds an attitude of the boom 9. In the raising hydraulic cylinder 12, an end of a cylinder portion is swingably connected to the turning base 7, and an end of a rod portion is swingably connected to the base boom member of the boom 9.

The raising hydraulic cylinder 12 is operated to be elongated/contracted by a raising valve 25 (see FIG. 2) which is an electromagnetic proportional switching valve. The raising valve 25 can control a flow rate of hydraulic oil supplied to the raising hydraulic cylinder 12 to any flow rate. The boom 9 is provided with a raising sensor 30 (see FIG. 2) which is a raising angle detection unit for detecting a raising angle θx (see FIG. 4).

The main winch 13 and the sub winch 15 are winding devices that wind up (reel up) and feed out (release) the main wire rope 14 and the sub wire rope 16.

The main winch 13 is driven as a main drum around which the main wire rope 14 is wound is rotated by a main hydraulic motor (not illustrated) as an actuator.

In addition, the sub winch 15 is driven as a sub drum around which the sub wire rope 16 is wound is rotated by a sub hydraulic motor (not illustrated) as an actuator.

The main hydraulic motor is rotationally operated by a main valve 26*m* (see FIG. 2) which is an electromagnetic proportional switching valve. The main winch 13 is configured to be driven at any winding-up speed and any feeding-out speed as the main hydraulic motor is controlled by the main valve 26*m*.

Similarly, the sub winch 15 is configured to be driven at any winding-up speed and any feeding-out speed as the sub hydraulic motor is controlled by a sub valve 26*s* (see FIG. 2) which is an electromagnetic proportional switching valve.

Each of the main winch 13 and the sub winch 15 is provided with a winding sensor 33 (see FIG. 2) that detects a fed-out amount l(n) of each of the main wire rope 14 and the sub wire rope 16.

The cabin 17 is an operator's seat covered with a housing. The cabin 17 is mounted on the turning base 7. The cabin 17 is provided with the operator's seat (not illustrated). The operator's seat is provided with an operation tool configured to operate the vehicle 2 to travel, and a turning operation tool 18, a raising operation tool 19, an elongation/contraction operation tool 20, a main drum operation tool 21*m*, a sub drum operation tool 21*s*, and the like which are configured to operate the crane device 6 (see FIG. 2).

The turning operation tool 18 can operate the turning hydraulic motor 8. The raising operation tool 19 can operate the raising hydraulic cylinder 12. The elongation/contraction operation tool 20 can operate the elongation/contraction hydraulic cylinder. The main drum operation tool 21*m* can operate the main hydraulic motor. The sub drum operation tool 21*s* can operate the sub hydraulic motor.

The cabin 17 is provided with the load moving operation tool 32 which is a load moving operation unit for inputting a moving direction and a moving speed of the load W. The load moving operation tool 32 an operation tool for inputting an instruction regarding the moving direction and speed of the load W on the horizontal plane.

The load moving operation tool 32 includes an operation lever and a sensor (not illustrated) that detects a tilt direction and a tilt amount of the operation lever. The load moving operation tool 32 is configured such that the operation lever can be tilted in any direction.

The load moving operation tool 32 is configured to transmit, to a control device 31 (see FIG. 2), an operation signal regarding the tilt direction and the tilt amount of an operation stick, detected by the sensor (not illustrated) with a forward direction from a seating direction of the operator's seat (hereinafter, simply referred to as a "forward direction") as an extending direction of the boom 9.

For example, when the load moving operation tool 32 is tilted, by any tilt amount, leftward with respect to the forward direction in a direction of a tilt angle of 45° in a state where the tip of the boom 9 faces the north, the crane 1 moves the load W at a speed corresponding to the tilt amount of the load moving operation tool 32 from the north, which is the extending direction of the boom 9, to the north-west which is the direction of the tilt angle of 45°. Note that the load moving operation tool 32 may be provided in a remote operation terminal.

Figure 2:
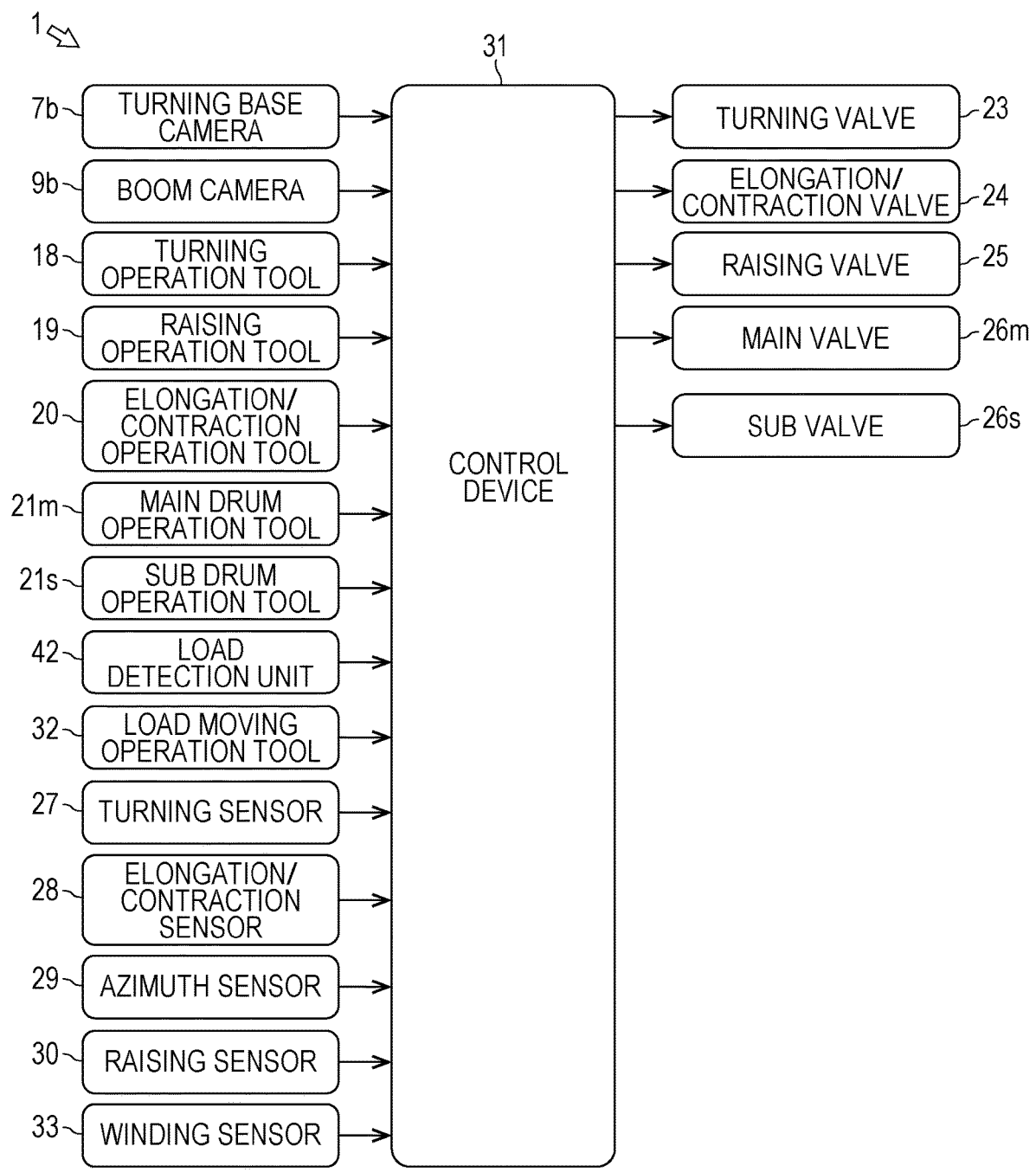
FIG. 2 is a block diagram illustrating a control configuration of the crane.

As illustrated in FIG. 2, the control device 31 is the control device 31 that controls an actuator of the crane device 6 via each operation valve. The control device 31 is provided in the cabin 17. In practice, the control device 31 may be configured such that a CPU (processor), a ROM, a RAM, an HDD, and the like are connected via a bus, or may be configured using a one-chip LSI (control circuit) or the like. The control device 31 stores various programs and data in order to control the operations of the respective actuators, switching valves, sensors, and the like.

The control device 31 is connected to the turning base camera 7*b*, the boom camera 9*b*, the turning operation tool 18, the raising operation tool 19, the elongation/contraction operation tool 20, the main drum operation tool 21*m*, and the sub drum operation tool 21*s*.

The control device 31 acquires a moving image from the turning base camera 7*b* and a moving image from the boom camera 9*b*. The control device 31 can acquire operation amounts of the turning operation tool 18, the raising operation tool 19, the main drum operation tool 21*m*, and the sub drum operation tool 21*s*.

The control device 31 is connected to the turning valve 23, the elongation/contraction valve 24, the raising valve 25, the main valve 26*m*, and the sub valve 26*s*. The control device 31 can transmit a target operating signal Md (not illustrated) or a corrected target operating signal AMd (see FIG. 3), which is a target operating amount of each valve, to the turning valve 23, the raising valve 25, the main valve 26*m*, and the sub valve 26*s*.

The control device 31 is connected to the turning sensor 27, the elongation/contraction sensor 28, the azimuth sensor 29, the raising sensor 30, and the winding sensor 33.

The control device 31 can acquire the turning angle θz of the turning base 7, an elongation/contraction length lb (n) of the boom 9, the raising angle θx of the boom 9, and the fed-out amount l(n) of the main wire rope 14 or the sub wire rope 16 (hereinafter, simply referred to as the "wire rope"), and an azimuth centered on the tip of the boom 9.

The control device 31 generates the target operating signal Md corresponding to each operation tool on the basis of the operation amounts of the turning operation tool 18, the raising operation tool 19, the main drum operation tool 21*m*, and the sub drum operation tool 21*s*. When influence of a deflection angle of the boom 9 is considered as will be described later, the control device 31 generates the corrected target operating signal AMd corresponding to each operation tool.

The crane 1 configured in this manner can move the crane device 6 to any position by causing the vehicle 2 to travel.

In addition, the crane 1 can increase a lifting height and an operating radius of the crane device 6 by raising the boom 9 at the raising angle θx by the raising hydraulic cylinder 12 with the operation of the raising operation tool 19 and extending the boom 9 to any boom length with the operation of the elongation/contraction operation tool 20.

In addition, the crane 1 can carry the load W by lifting the load W with the sub drum operation tool 21*s* and the like and turning the turning base 7 with the operation of the turning operation tool 18.

The control device 31 calculates a target course signal Pdα (see FIG. 3) of the load W on the basis of the azimuth of the tip of the boom 9 acquired by the azimuth sensor 29. Further, the control device 31 calculates a target position coordinate p(n+1) of the load W, which is a target position of the load W, from the target course signal Pdα.

Figure 3:
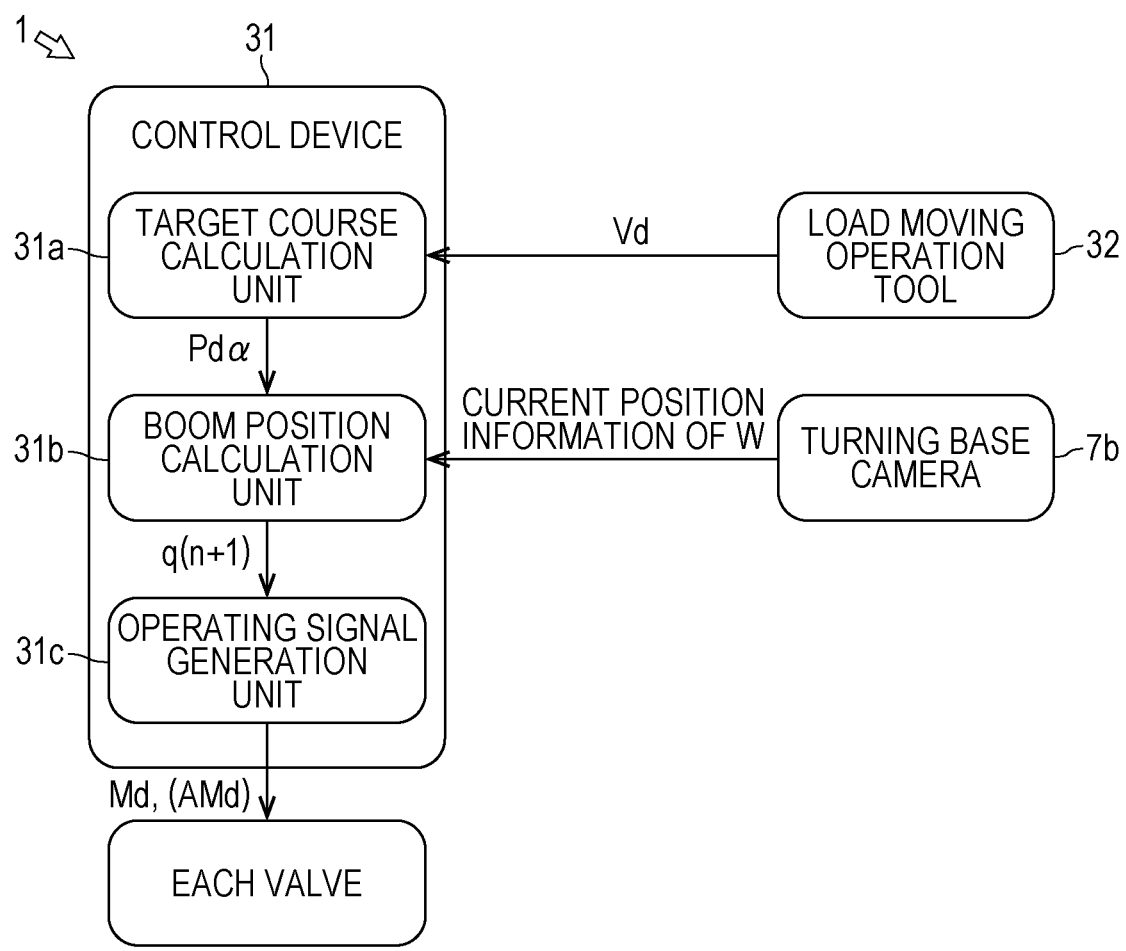
FIG. 3 is a block diagram illustrating a control configuration of a control device according to the present embodiment.

The control device 31 generates the target operating signals Md or the corrected target operating signals AMd of the turning valve 23, the elongation/contraction valve 24, the raising valve 25, the main valve 26m, and the sub valve 26s for moving the load W to the target position coordinate p(n+1) (see FIG. 3).

The crane 1 moves the load W toward the tilt direction of the load moving operation tool 32, at the speed according to the tilt amount. At this time, the crane 1 controls the turning hydraulic motor 8, the elongation/contraction hydraulic cylinder, the raising hydraulic cylinder 12, the main hydraulic motor, and the like by the target operating signals Md or the corrected target operating signals AMd.

With such a configuration, the crane 1 calculates a target moving speed signal Vd, which is a control signal of a target moving speed of the load W including a moving direction and a speed on the basis of the operation direction of the load moving operation tool 32, every unit time t with the extending direction of the boom 9 as a reference, and determines the target position coordinate p(n+1) of the load W. Accordingly, an operator does not lose recognition of a direction in which the crane device 6 is operated with respect to the operation direction of the load moving operation tool 32.

That is, the operation direction of the load moving operation tool 32 and the moving direction of the load W are calculated on the basis of the extending direction of the boom 9 as the common reference. As a result, the crane device 6 can be operated easily and simply.

Note that the load moving operation tool 32 is provided inside the cabin 17 in the present embodiment, but may include a terminal-side radio and be provided in a remote operation terminal that can be remotely operated from the outside of the cabin 17.

Next, a description will be given with reference to FIGS. 3 to 9 regarding an example of a control process which is performed in the control device 31 of the crane device 6 and in which the target course signal Pdα of the load W for generating the target operating signal Md (corrected target operating signal AMd) and a target position coordinate q(n+1) (hereinafter, simply referred to as the "target position coordinate q(n+1) of the boom 9") of the tip of the boom 9 (a fed-out position of the wire rope) which is a target position of the tip of the boom 9.

As illustrated in FIG. 3, the control device 31 includes a target course calculation unit 31a, a boom position calculation unit 31b, and an operating signal generation unit 31c. In addition, the control device 31 is configured to be capable of acquiring current position information of the load N as the load position detection unit by using the set of turning base cameras 7b on both the left and right sides in front of the turning base 7 as the stereo cameras (see FIG. 2).

As illustrated in FIG. 3, the target course calculation unit 31a is a part of the control device 31, and converts the target moving speed signal Vd of the load W into the target course signal Pdα of the load W. The target course calculation unit 31a can acquire the target moving speed signal Vd or the load W including the moving direction and speed of the load W from the load moving operation tool 32 every unit time t. The target moving speed signal Vd corresponds to an example of information related to the target speed of the load.

In addition, the target course calculation unit 31a can calculate the target course signals Pdα in an x-axis direction, a y-axis direction, and a z-axis direction of the load W every unit time t by integrating the acquired target moving speed signals Vd. Here, the subscript α is a sign representing any of the x-axis direction, the y-axis direction, and the z-axis direction. The above target course calculation unit 31a has functions of an integrator 32a and a target value filter 35 illustrated in FIG. 5 to be described later.

The boom position calculation unit 31b is a part of the control device 31, and can acquire the target course signal Pdα from the target course calculation unit 31a. The boom position calculation unit 31b calculates a position coordinate of the tip of the boom 9 from attitude information of the boom 9 and the target course signal Pdα of the load W.

The boom position calculation unit 31b acquires a turning angle θz(n) of the turning base 7 from the turning sensor 27. The boom position calculation unit 31b acquires the elongation/contraction length lb(n) from the elongation/contraction sensor 28. The boom position calculation unit 31b acquires a raising angle θx (n) from the raising sensor 30.

In addition, the boom position calculation unit 31b acquires information related to the load detected by a load detection unit 42 (see FIG. 2) from the load detection unit 42. The information related to the load may be regarded as information related to a downward load acting on the tip of the boom 9 in the vertical direction.

The information related to the load includes, for example, a weight of the wire rope fed out from the tip of the boom 9 and a weight of members (the load W, a slinging tool, a hook, and the like) suspended on the wire rope. The boom position calculation unit 31b acquires the current position information of the load W from an image of the load W captured by the set of turning base cameras 7b arranged on the left and right sides in front of the turning base 7 (see FIG. 2).

For example, the boom position calculation unit 31b calculates the current position coordinate p(n) of the load W from the acquired current position information of the load W. In addition, the boom position calculation unit 31b can calculate a current position coordinate q(n) (hereinafter, simply referred to as the "current position coordinate q(n) of the boom 9") of the tip of the boom 9 which is the current position of the tip of the boom 9 (the fed-out position of the wire rope) from the acquired turning angle θz(n), elongation/contraction length lb(n), and raising angle θx(n).

In addition, the boom position calculation unit 31b can calculate the fed-out amount l(n) of the wire rope on the basis of the current position coordinate p(n) of the load W and the current position coordinate q(n) of the boom 9. In addition, the boom position calculation unit 31b can calculate the target position coordinate p(n+1) of the load W, which is a position of the load W after a lapse of the unit time t, from the target course signal Pdα.

Further, the boom position calculation unit 31b can calculate tension f(n) and a direction vector e(n+1) of the wire rope on which the load W is suspended on the basis of the current position coordinate p(n) of the load W and the target position coordinate p(n+1) of the load W.

The boom position calculation unit 31b is configured to calculate the target position coordinate p(n+1) of the boom 9 after the lapse of the unit time t, on the basis of the target position coordinate p(n+1) of the load W and the direction vector e(n+1) of the wire rope using an inverse dynamics model.

Further, the boom position calculation unit 31b calculates information related to a deflection of the crane 1. Specifically, the boom position calculation unit 31b calculates a deflection angle δ(n) in the vertical direction and a deflection angle ε(n) in the turning direction of the boom 9, which are examples of the information related to the deflection of the crane 1, on the basis of the attitude information of the crane 1, the tension f(n) of the wire rope calculated in the inverse dynamics model, and the direction vector e(n) which is the direction of the wire rope (see FIGS. 6A and 6B).

The boom position calculation unit 31b corrects the current position coordinate q(n) of the boom 9 and the target position coordinate q(n+1) of the boom 9 on the basis of the deflection angle δ(n) of the boom 9 in the vertical direction (see Formula (7) to be described later) and the deflection angle ε(n) of the boom 9 in the turning direction (see Formula (8) to be described later).

Further, the boom position calculation unit 31b calculates the corrected target operating signal AMd, which is a corrected target operating amount, from the corrected current position coordinate q(n) of the boom 9 and target position coordinate q(n+1) of the boom 9.

The operating signal generation unit 31c is a part of the control device 31, and generates the corrected target operating signal AMd and the like of each actuator from the corrected target position coordinate q(n+1) of the boom 9 after the lapse of the unit time t.

The operating signal generation unit 31c can acquire the corrected target position coordinate q(n+1) of the boom 9 after the lapse of the unit time t from boom position calculation unit 31b. The operating signal generation unit 31c is configured to generate the corrected target operating signal AMd of the turning valve 23, the elongation/contraction valve 24, the raising valve 25, the main valve 26m, and/or the sub valve 26s, and a feedback operating signal AMd1 and a feed-forward operating signal AMd2, which will be described later, from the corrected current position coordinate q(n) of the boom 9 and the target position coordinate p(n+1) of the load W.

Figure 4:
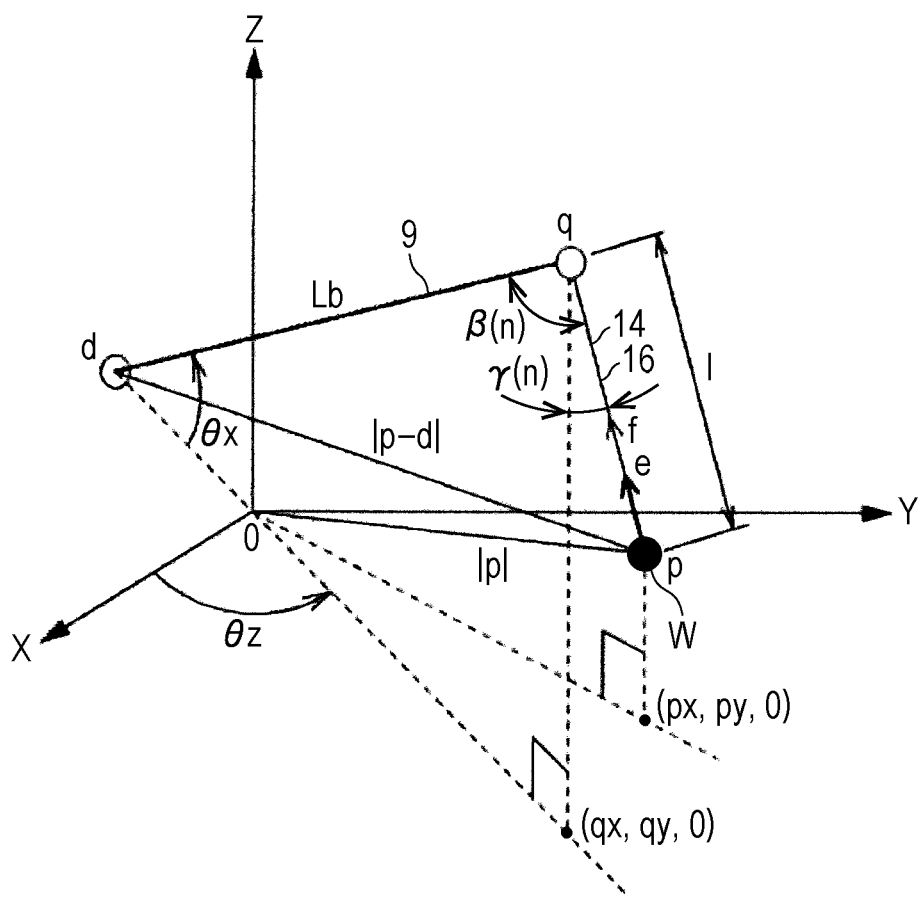
FIG. 4 is a view illustrating an inverse dynamics model of the crane.

Next, the control device 31 determines the inverse dynamics model of the crane 1 for calculating the target position coordinate q(n+1) of the boom 9 as illustrated in FIG. 4. The inverse dynamics model is defined in the XYZ coordinate system, and takes an origin O as a turning center of the boom 9.

The control device 31 defines each of q, p, lb, θx, θz, l, f, and e in the inverse dynamics model. For example, q represents the current position coordinate q(n) of the boom 9. For example, p represents the current position coordinate p(n) of the load W. For example, lb represents the elongation/contraction length lb(n) of the boom 9. For example, θx represents the raising angle θx(n). For example, θz represents the turning angle θz(n). For example, i represents the fed-out amount l(n) of the wire rope. For example, f represents the tension f(n) of the wire rope. For example, e represents the direction vector e(n) of the wire rope.

In the inverse dynamics model defined in this manner, the relationship between a target position q at the tip of the boom 9 and a target position p of the load W is expressed by Formula (2) using the target position p of the load W, a mass m of the load W, and a spring constant kf of the wire rope. In addition, the target position q of the tip of the boom 9 is calculated by Formula (3) that is a function of time of the load W (a function representing the time t by n).

[Formula 2]

$$mp = mg + f = mg + k_f(q-p) \quad (2)$$

[Formula 3]

$$q(n) = p(n) = l(n,\alpha)e(n) = q(p(n),p(n),\alpha) \quad (3)$$

f: tension of wire rope, kf: spring constant, m: mass of load W, g: current position or target position of tip of boom 9, p: current position or target position of load W, l: fed-out amount of wire rope, e: direction vector, g: gravitational acceleration The fed-out amount l(n) of the wire rope is calculated from the following Formula (4). The fed-out amount l(n) of the wire rope is defined by a distance between the current position coordinate q(n) of the boom 9, which is the position of the tip of the boom 9, and the current position coordinate p(n) of the load W which is the position of the load W.

[Formula 4]

$$l(n)^2 = |q(n)-p(n)|^2 \quad (4)$$

The direction vector e(n) of the wire rope is calculated from the following Formula (5). The direction vector e(n) of the wire rope is a vector of a unit length of the tension f(n) of the wire rope (see Formula (2)). The tension f(n) of the wire rope is calculated by subtracting the gravitational acceleration from the acceleration of the load W calculated from the current position coordinate p(n) of the load W and the target position coordinate p (n+1) of the load W after the lapse of the unit time t.

[Formula 5]

$$e(n) = \frac{f}{|f|} = \frac{\overline{p}(n) - g}{|\overline{p}(n) - g|} \quad (5)$$

The target position coordinate q(n+1) of the boom 9, which is the target position of the tip of the boom 9 after the lapse of the unit time t, is calculated from Formula (6) obtained by expressing Formula (2) as a function of n. Here, α indicates the turning angle θz(n) of the boom 9.

The target position coordinate q(n+1) of the boom 9 is calculated using the inverse dynamics from the fed-out amount l(n) of the wire rope, the target position coordinate p(n+1) of the load W, and the direction vector e(n+1).

[Formula 6]

$$q(n+1) = p(n+1) + l(n,\alpha)e(t+1) = q(p(n+1),\ddot{p}(n+1),\alpha) \quad (6)$$

Next, a description will be given with reference to FIGS. 5, 6A, and 6B regarding a process of generating the corrected target operating signals AMd (the feedback operating signal AMd1 and the feed-forward operating signal AMd2) and a process of correcting the current position coordinate q(n) and the target position coordinate q(n+1) on the basis of the information related to the deflection of the crane 1 (specifically, the deflection angle of the boom 9), the processes being performed by a control system 34 of the crane 1 including a learning-type inverse dynamics model.

The crane 1 includes, as the control system 34 of the crane 1, the turning base camera 7b, the turning sensor 27, the elongation/contraction sensor 28, the raising sensor 30, the load moving operation tool 32, the target value filter 35, a target operating amount calculation unit 36, a deflection angle calculation unit 37, a feedback control unit 38, and a feed-forward control unit 41.

In the control system 34, the target course calculation unit 31a, the boom position calculation unit 31b, and the operating signal generation unit 31c of the control device 31 cooperate to constitute the target operating amount calculation unit 36, the deflection angle calculation unit 37, the feedback control unit 38, and the feed-forward control unit 41.

Figure 5:
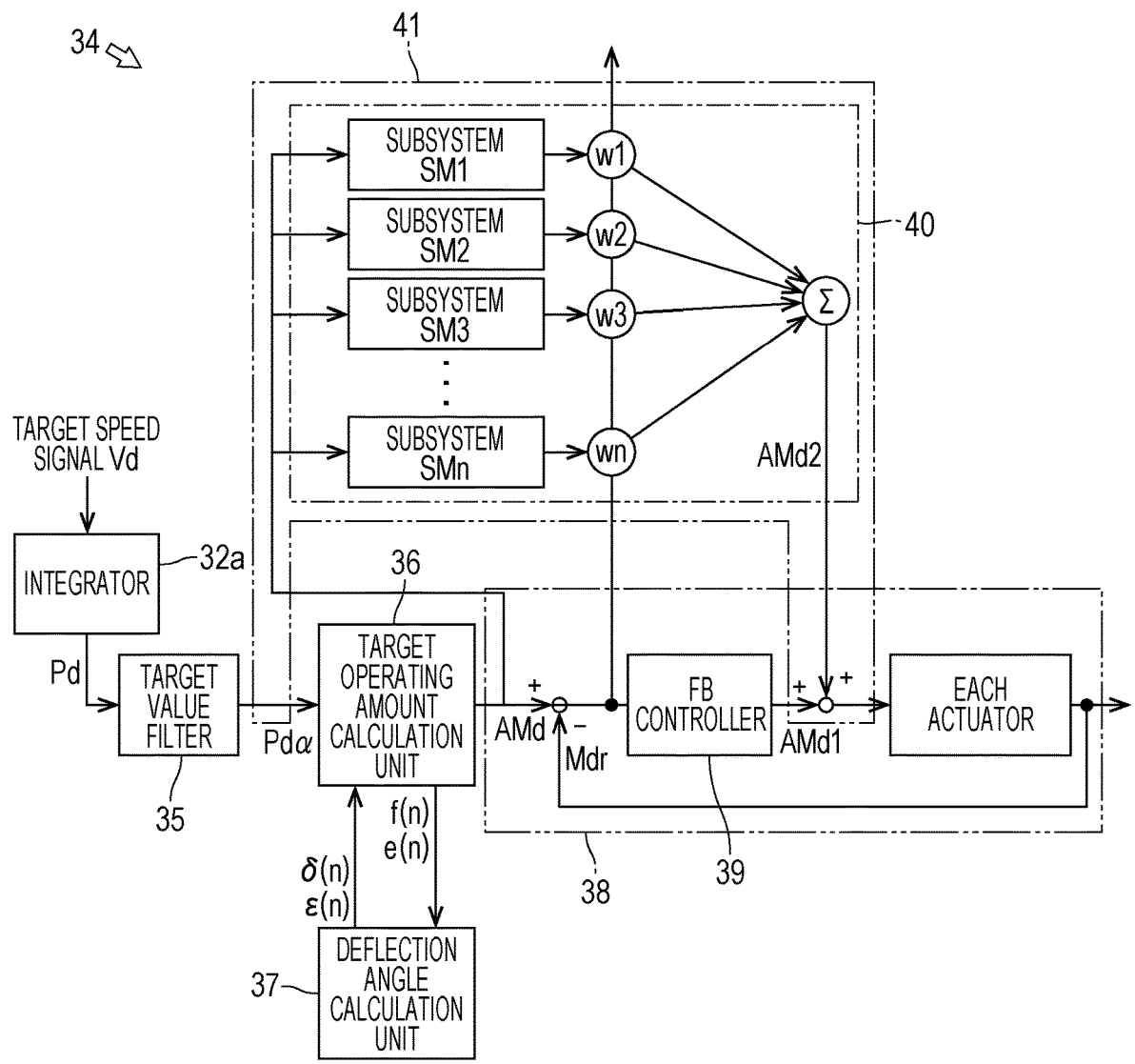
FIG. 5 is a block diagram illustrating a control configuration of the control system according to the present embodiment.

In the case of the present embodiment, the control system 34 is a control system that controls the actuator of the crane, and includes a signal processing unit (the target value filter 35 and the target operating amount calculation unit 36) that generates a signal (the corrected target operating signal AMd) related to a target operating amount of the actuator as illustrated in FIG. 5.

In addition, the control system 34 includes the feedback control unit 38 that controls the actuator on the basis of a difference between the signal (corrected target operating signal AMd) related to the target operating amount and a fed-back signal (actual operating signal Mdr) related to the operating amount of the actuator.

In addition, the control system 34 includes the feed-forward control unit 41 that controls the actuator on the basis of the signal (corrected target operating signal AMd) related to the target operating amount in cooperation with the feedback control unit 38, and learns characteristics of the actuator by adjusting a weighting factor on the basis of a teacher signal (the difference between the corrected target operating signal AMd and the actual operating signal Mdr).

In addition, the signal processing unit of the control system 34 (the target value filter 35 and the target operating amount calculation unit 36) removes a pulse-shaped component from an input signal (target moving position signal Pd) to convert the input signal (target moving position signal Pd) into the signal (corrected target operating signal AMd) related to the target operating amount.

Further, the signal processing unit of the control system 34 corrects intermediate information (the current position coordinate q(n) of the boom 9 and the target position coordinate g(n+1) of the boom 9 which will be described later) generated in the process of generating the signal (corrected target operating signal AMd) related to the target operating amount on the basis of the information related to the deflection of the crane, and generates the signal (corrected target operating signal AMd) related to the target operating amount.

Specifically, the target value filter 35 calculates the target course signal Pdα of the load W from the target moving position signal Pd which is the control signal for the target moving position of the load W as illustrated in FIG. 5. The target value filter 35 corresponds to an example of the signal processing unit and an example of a first processing unit, and attenuates a frequency component equal to or higher than a predetermined frequency included in the target moving position signal Pd.

The target value filter 35 receives the target moving position signal Pd of the load W obtained by converting the target moving speed signal Vd of the load moving operation tool 32 by the integrator 32a. The integrator 32a corresponds to an example of a front processing unit.

The target moving position signal Pd of the load W corresponds to an example of the input signal input to the signal processing unit. The target moving position signal Pd is, for example, a pulse-shaped (step-shaped) signal. When the target value filter 35 is applied, the target moving position signal Pd is converted into the target course signal Pdα from which the pulse-shaped component has been removed.

In other words, when the target value filter 35 is applied, the target moving position signal Pd is converted into the target course signal Pdα in which a rapid change in which a time change (in other words, the speed in each axial direction of position coordinates) of a target course has a pulse shape (step shape) is suppressed.

Since the target course signal Pdα does not contain the pulse-shaped component, generation of a singular point (rapid position variation) due to a differential operation in the feed-forward control unit 41 is suppressed.

The target value filter 35 includes, for example, a transfer function G(s) of Formula (1). The transfer function G(s) is expressed in a for of a partial fraction decomposition where $T_1$, $T_2$, $T_3$, $T_4$, $C_1$, $C_2$, $C_3$, and $C_4$ are coefficients and s is a differential element. The transfer function G(s) of Formula (1) is set for each of the x axis, the y axis, and the z axis. In this manner, the transfer function G(s) can be expressed as a superposition of the transfer functions with the first-order lag. The target value filter 35 converts the target moving position signal Pd into the target course signal Pdα by multiplying the target moving position signal Pd of the load W by the transfer function G(s). Note that the target value filter 35 is not limited to the case of the present embodiment. The target value filter 35 may be various filters capable of attenuating the frequency component equal to or higher than the predetermined frequency from the input signal. For example, the target value filter 35 may be a third-order or lower low-pass filter.

[Formula 1]

$$G(s) = \frac{C_1}{(T_1 s + 1)} + \frac{C_2}{(T_2 s + 1)} + \frac{C_3}{(T_3 s + 1)} + \frac{C_4}{(T_4 s + 1)} \quad (1)$$

$T_1$, $T_2$, $T_3$, $T_4$, $C_1$, $C_2$, $C_3$, and $C_4$ coefficients, s: differential element The target operating amount calculation unit 36 corresponds to an example of the signal processing unit and an example of a second processing unit, and generates the corrected target operating signal AMd on the basis of the target course signal Pdα.

Specifically, the target operating amount calculation unit 36 generates the target position coordinate p(n+1), which is the target position of the load W, and the corrected target operating signal AMd of each actuator from the attitude information of the crane 1, the current position information of the load W, and the target course signal Pdα of the load d using the inverse dynamics model. The target operating amount calculation unit 36 has the inverse dynamics model.

The target operating amount calculation unit 36 is connected in series to the target value filter 35. The target operating amount calculation unit 36 calculates the fed-out amount l(n) of the wire rope and the target position coordinate q(n+1) of the boom 9 after the lapse of the unit time t using the inverse dynamics model from the target course signal Pdα acquired from the target value filter 35, the current position coordinate p(n) of the load W calculated from the current position information of the load W acquired from the turning base camera 7b and the attitude information (the turning angle θz(n)) of the crane 1, the elongation/contraction length lb(n), and the raising angle θx(n) acquired from the respective sensors.

Next, the target operating amount calculation unit 36 generates the corrected target operating signal AMd representing the target operating amount of each actuator from the target position coordinate q(n+1) calculated in the inverse dynamics model.

The deflection angle calculation unit 37 calculates the information related to the deflection of the crane 1. Specifically, the deflection angle calculation unit 37 calculates the deflection angle δ(n) in the vertical direction and the deflection angle ε(n) in the turning direction of the boom 9 on the basis of the attitude information of the crane 1, the tension f(n) of the wire rope calculated by the inverse dynamics model of the target operating amount calculation unit 36, and the direction vector e(n) which is the direction of the wire rope.

The deflection angle δ(n) of the boom 9 in the vertical direction corresponds to an example of information related to a deflection angle of the boom in the vertical direction. The deflection angle ε(n) of the boom 9 in the turning direction corresponds to an example of information related to a deflection angle of the boom in the turning direction.

The deflection angle calculation unit 37 is connected in series to the target operating amount calculation unit 36. The deflection angle calculation unit 37 acquires the raising angle θx(n) detected by the raising sensor 30, the elongation/contraction length lb(n) which is the attitude information of the crane 1 detected by the elongation/contraction sensor 28, the tension f(n) of the wire rope calculated in the inverse dynamics model of the target operating amount calculation unit 36, and the direction vector e(n) which is the direction of the wire rope.

The deflection angle calculation unit 37 calculates a radial angle β(n), which is an angle formed by the direction vector e(n) with respect to the axis of the boom 9, and a circumferential angle γ(n) which is an angle of the boom 9 in the turning direction formed by the direction vector e(n) with respect to the vertical line (see FIG. 4).

Further, the deflection angle calculation unit 37 calculates a component force fβ(n)=f(n)×SIN β(n) of the tension f(n) in the raising direction, perpendicular to the axis of the boom 9, and a component force fγ(n)=f(n)×SIN γ(n) of the tension f(n) in the turning direction of the boom 9.

Figure 6A:
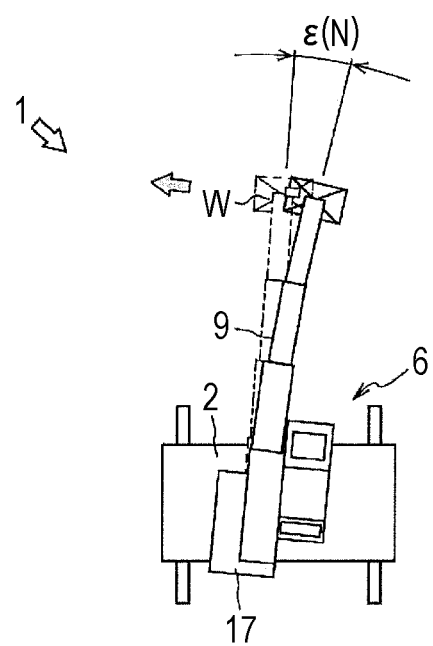
FIG. 6A is a plan view illustrating a deflection of a boom in a turning direction.
Figure 6B:
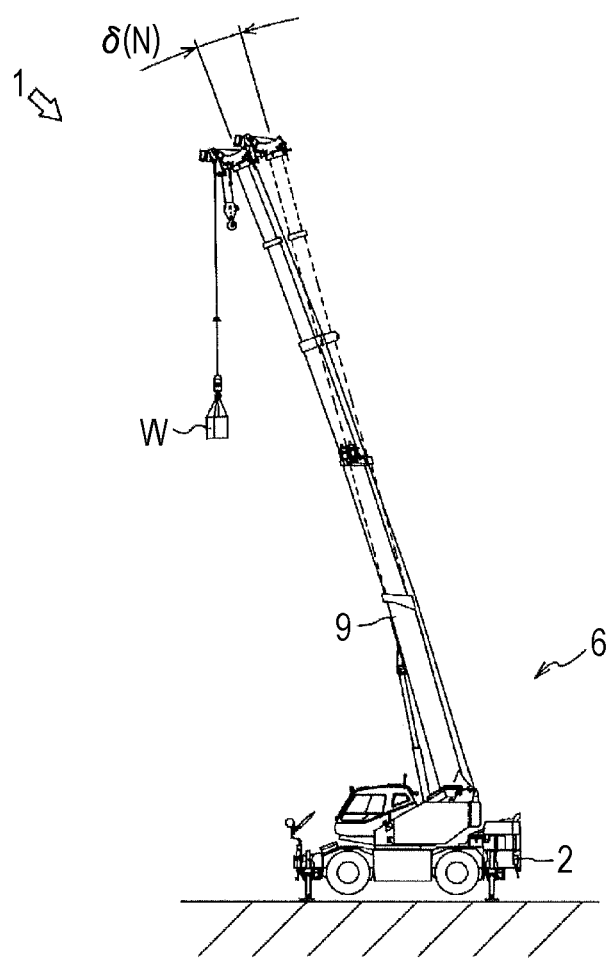
FIG. 6B is a side view illustrating a deflection of the boom in a raising direction.

As illustrated in FIGS. 6A and 6B, the deflection angle calculation unit 37 calculates the deflection angle δ(n) in the vertical direction of the boom 9 and the deflection angle ε(n) in the turning direction of the boom 9 from the raising-direction component force fβ(n) and the turning-direction component force fγ(n).

The deflection angle δ(n) of the boom 9 in the vertical direction is calculated from The following Formula (7), where E is a Young's modulus of a material used for the boom 9 and I is an area moment of inertia of the boom 9.

Similarly, the deflection angle ε(n) of the boom 9 in the turning direction is calculated from the following Formula (8). The deflection angle calculation unit 37 transmits the calculated deflection angle δ(n) of the boom 9 in the vertical direction and the deflection angle ε(n) of the boom 9 in the turning direction to the target operating amount calculation unit 36.

The deflection angle calculation unit 37 may calculate information related to a deflection of a vehicle body of the crane 1 as the information related to the deflection. The deflection angle calculation unit 37 transmits the information related to the deflection of the vehicle body of the crane 1 to the target operating amount calculation unit 36.

[Formula 7]

$$\delta(n) = \frac{f\beta(n)\text{lb}(n)^2}{EI} \quad (7)$$

[Formula 8]

$$\varepsilon(n) = \frac{f\gamma(n)\text{lb}(n)^2}{EI} \quad (8)$$

As illustrated in FIG. 5, when acquiring the deflection angle δ(n) of the boom 9 in the vertical direction and the deflection angle ε(n) of the boom 9 in the turning direction, the target operating amount calculation unit 36 corrects the current position coordinate q(n) of the boom 9 and the target position coordinate q(n+1) of the boom 9 on the basis of the deflection angle δ(n) in the vertical direction and the deflection angle ε(n) in the turning direction.

The current position coordinate q(n) of the boom 9 and the target position coordinate q(n+1) of the boom 9 correspond to examples of the intermediate information generated is the process of generating the corrected target operating signal AMd in the target operating amount calculation unit 36.

Further, the target operating amount calculation unit 36 calculates the corrected target operating signal AMd, which is a corrected target operating amount, from the corrected current position coordinate q(n) of the boom 9 and target position coordinate q(n+1) of the boom 9. The corrected target operating signal AMd corresponds to an example of information related to a target operating amount.

The feedback control unit 38 generates the feedback operating signal AMd1 that is a feedback operating amount of each actuator generated on the basis of the difference between the corrected target operating signal AMd and the actual operating signal Mdr which represents the actual operating amount of each actuator with respect to the corrected target operating signal AMd.

The feedback control unit 38 includes a feedback controller 39 that generates the feedback operating signal AMd1. The feedback controller 39 is connected in series to the target operating amount calculation unit 36.

The feedback control unit 38 can acquire the actual operating signal Mdr from each sensor of the crane 1. The feedback control unit 38 is configured to feed back the actual operating signal Mdr to the corrected target operating signal AMd.

The feedback control unit 38 acquires the corrected target operating signal AMd of the load W from the target operating amount calculation unit 36. In addition, the feedback control unit 38 acquires the actual operating signal Mdr from each sensor of the crane 1.

The feedback control unit 38 feeds back (negatively feeds back) the acquired actual operating signal Mdr to the acquired corrected target operating signal AMd. The feedback control unit 38 calculates the feedback operating signal AMd1 on the basis of the difference between the actual operating signal Mdr and the corrected target operating signal AMd.

The feed-forward control unit 41 generates the feed-forward operating signal AMd2, which is a feed-forward operating amount of each actuator, on the basis of the corrected target operating signal AMd. The feed-forward control unit 41 has a learning-type inverse dynamics model 40.

The feed-forward control unit 41 includes, for example, the learning-type inverse dynamics model 40 in which a plurality of characteristics of the crane 1 is represented by n subsystems. The learning-type inverse dynamics model 40 is connected in parallel to the target operating amount calculation unit 36.

In addition, in the learning-type inverse dynamics model 40, a plurality of subsystems, namely, a first subsystem SM1, a second subsystem SM2, a third subsystem SM3, ..., and an nth subsystem SMn, are coupled in parallel. That is, the respective subsystems of the learning-type inverse dynamics model 40 are connected in parallel with the feedback controller 39.

In the learning-type inverse dynamics model 40, a weighting factor $w_1$, a weighting factor $w_2$, a weighting factor $w_3$, . . . , and a weighting factor $w_n$ are assigned to the first subsystem SM1, the second subsystem SM2, the third subsystem ST3, . . . , and the nth subsystem SMn, respectively.

The feed-forward control unit 41 adjusts each of the weighting factors $w_1$, $w_2$, $w_3$, . . . , and $w_n$ of the model on the basis of the difference of the actual operating signal Mdr from the corrected target operating signal AMd. In this manner, the feed-forward control unit 41 is configured to be capable of learning the learning-type inverse dynamics model 40 having the characteristics of the crane 1 by adjusting the weighting factor of the learning-type inverse dynamics model 40.

The feed-forward control unit 41 acquires the corrected target operating signal AMd from the target operating amount calculation unit 36. In addition, the feed-forward control unit 41 acquires the difference between the actual operating signal Mdr and the corrected target operating signal AMd from the feedback control unit 38.

The feed-forward control unit 41 adjusts each of the weighting factors $w_1$, $w_2$, $w_3$, . . . , and $w_n$ of the model on the basis of the difference of the actual operating signal Mdr from the corrected target operating signal AMd. That is, the feed-forward control unit 41 adjusts the weighting factor of one layer of the learning-type inverse dynamics model 40 on the basis of the difference of the actual operating amount from the target operating amount, whereby characteristics of each subsystem are adapted to actual characteristics of the crane 1.

The feed-forward control unit 41 generates the feed-forward operating signal AMd2 of each actuator on the basis of the corrected target operating signal AMd. The feed-forward control unit 41 adds the generated feed-forward operating signal AMd2 to the feedback operating signal AMd1.

The control system 34 of the crane 1 transmits an operating signal (final operating signal), obtained by adding the feedback operating signal AMd1 calculated by the feedback control unit 38 and the feed-forward operating signal AMd2 calculated by the feed-forward control unit 41, to each actuator of the crane 1.

After transmitting the feedback operating signal AMd1 and the feed-forward operating signal AMd2 to each actuator, the control system 34 feeds back the actual operating signal Mdr detected by each sensor of the crane 1 and subtracts the actual operating signal Mdr from the corrected target operating signal AMd. The control system 34 adjusts the weighting factor of the learning-type inverse dynamics model 40 on the basis of the difference of the actual operating signal Mdr from the corrected target operating signal AMd.

In the control system 34, the difference of the actual operating signal Mdr from the corrected target operating signal AMd decreases as the degree of deviation between the characteristics of the learning-type inverse dynamics model 40 of the feed-forward control unit 41 and the characteristics of the crane 1 decreases.

In addition, the control system 34 decreases the amount of adjustment of the weighting factor of the learning-type inverse dynamics model 40 as the difference of the actual operating signal Mdr from the corrected target operating signal AMd decreases. That is, as the characteristics of the learning-type inverse dynamics model 40 are approximated to the characteristics of the crane 1 by learning, the proportion of control using the feedback operating signal AMd1 calculated by the feedback control unit 38 decreases, and the proportion of control using the feed-forward operating signal AMd2 increases in the control system 34.

Next, feed-forward learning control of the crane 1 in the control system 34 will be described in detail with reference to FIGS. 7 to 10.

Figure 7:
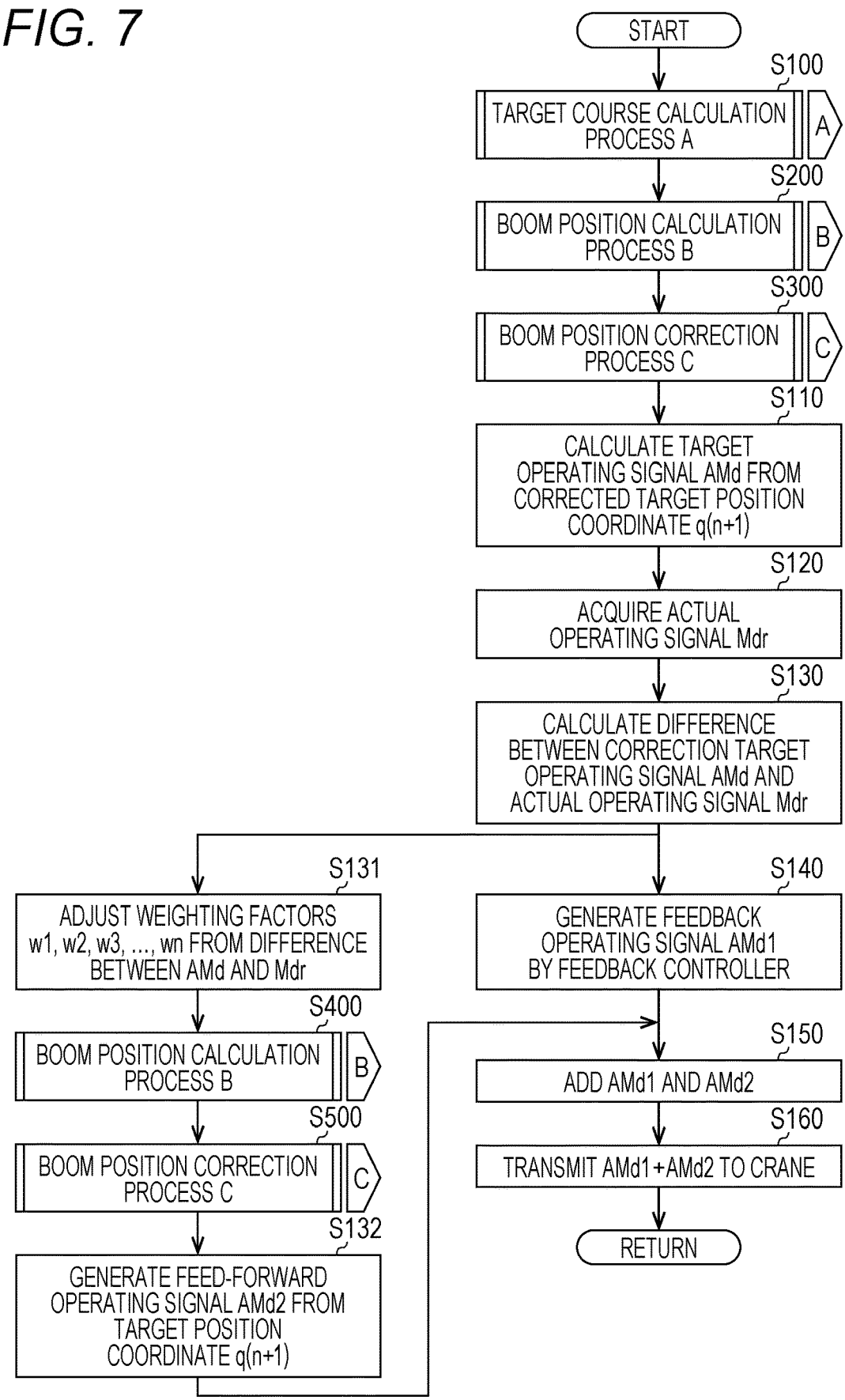
FIG. 7 is a view of a flowchart illustrating a control process of the crane.
Figure 8:
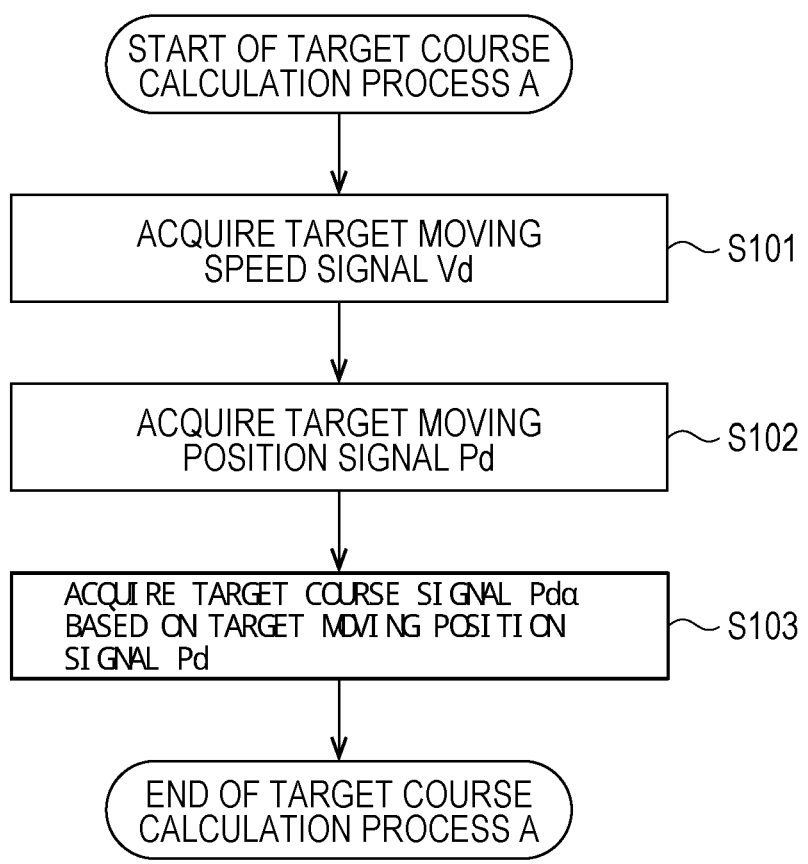
FIG. 8 is a view of a flowchart illustrating a target course calculation process in the control process of the crane.

As illustrated in FIG. 7, in step S100, the control system 34 starts a target course calculation process A and causes the step to transition to step S101 (see FIG. 8). Then, when the target course calculation process A ends, the step transitions to step S200 (see FIG. 7).

Figure 9:
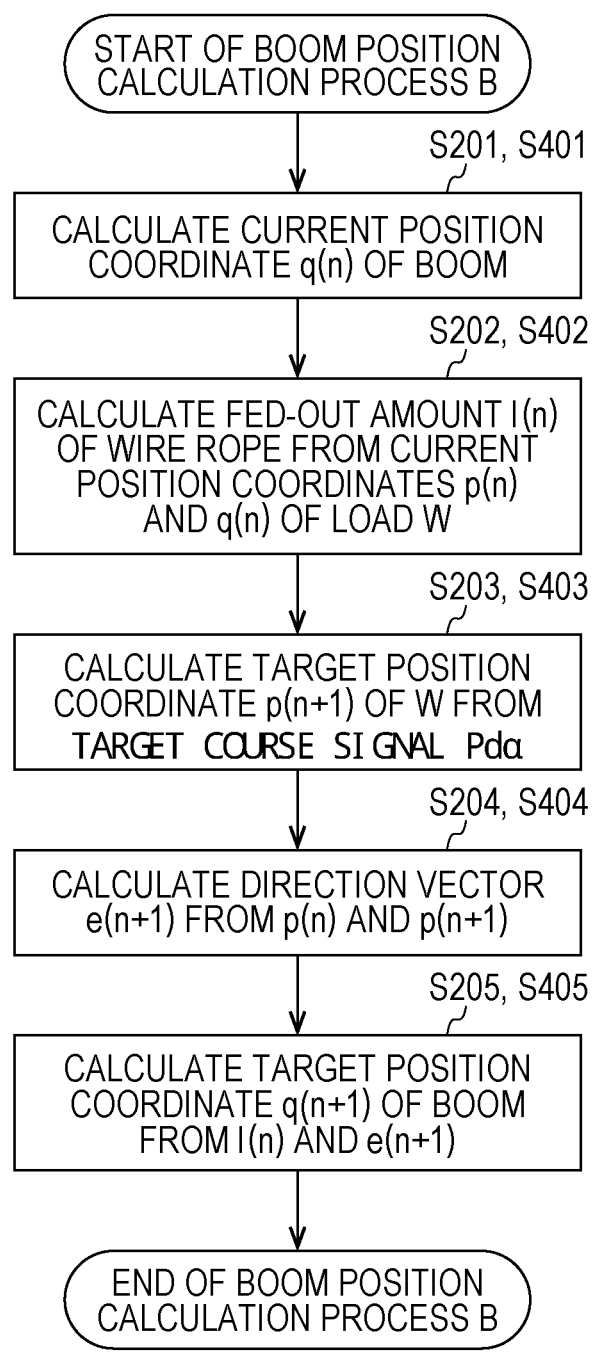
FIG. 9 is view of a flowchart illustrating a boom position calculation process in the control process of the crane.

In step S200, the control system 34 starts a boom position calculation process B and causes the step to transition to step S201 (see FIG. 9). Then, when the boom position calculation process B ends, the step transitions to step S300 (see FIG. 7).

Figure 10:
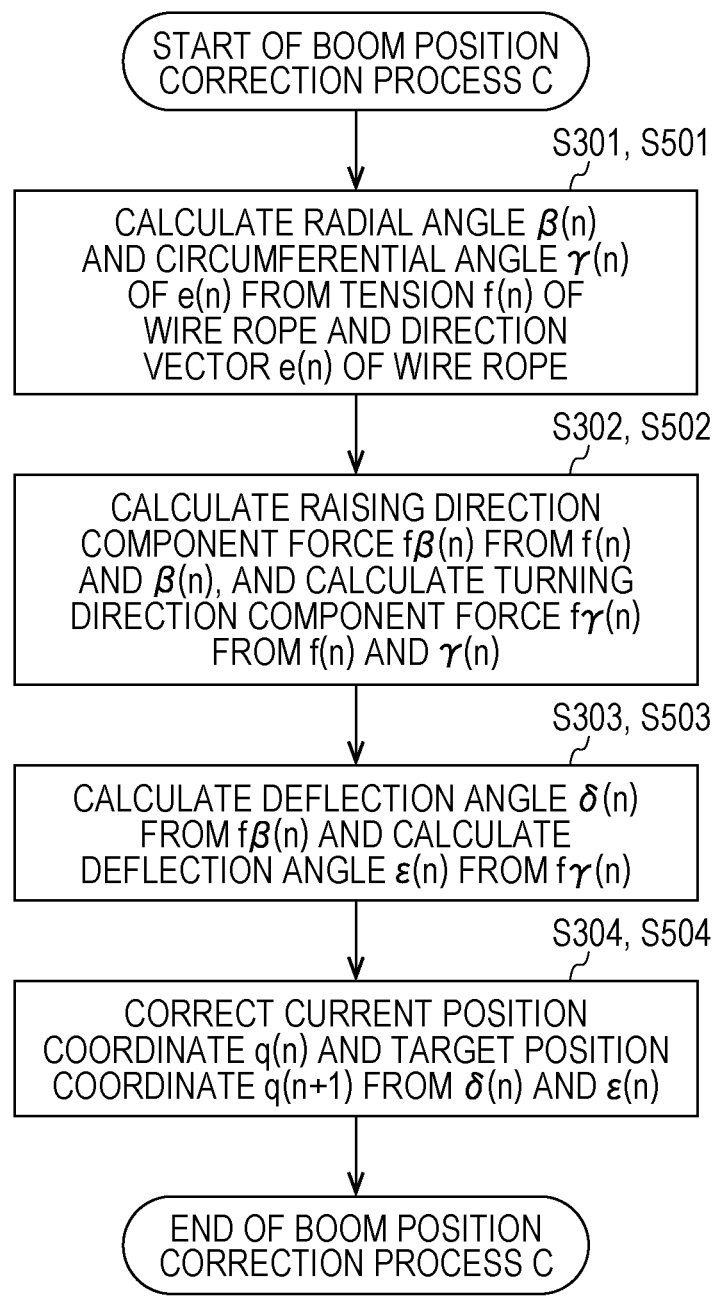
FIG. 10 is a view of a flowchart illustrating a boom position correction process in the control process of the crane.

In step S300, the control system 34 starts a boom position correction process C and causes the step to transition to step S301 (see FIG. 10). Then, when the boom position correction process C ends, the step transitions to step S110 (see FIG. 7).

As illustrated in FIG. 7, in step S110, the control system 34 causes the target operating amount calculation unit 36 to calculate the corrected target operating signal AMd from the corrected target position coordinate q(n+1) of the boom 9, and causes the step to transition to step S120. The target position coordinate q(n+1) of the boom 9 before the correction is simply referred to as the target position coordinate q(n+1) of the boom 9. On the other hand, the target position coordinate q(n+1) of the boom 9 after correction is referred to as the corrected target position coordinate q(n+1) of the boom 9.

In step S120, the control system 34 acquires the actual operating signal Mdr from each sensor of the crane 1, and causes the step to transition to step S130.

In step S130, the control system 34 causes the feedback control unit 38 to calculate a difference between the corrected target operating signal AMd and the actual operating signal Mdr, and causes the step to transition to step S140.

In step S140, the control system 34 causes the feedback controller 39 to generate the feedback operating signal AMd1 on the basis of the difference between the corrected target operating signal AMd and the actual operating signal Mdr, and causes the step to transition to step S150.

In step S131, the control system 34 causes the feed-forward control unit 41 to adjust the weighting factors $w_1$, $w_2$, $w_3$, . . . , $w_n$ of the learning-type inverse dynamics model 40 on the basis of the difference between the corrected target operating signal AMd and the actual operating signal Mdr, and causes the step to transition to step S400.

In step S400, the control system 34 starts the boom position calculation process B and causes the step to transition to step S401 (see FIG. 9). Then, when the boom position calculation process B ends, the step transitions to step S500 (see FIG. 7).

In step S500, the control system 34 starts the boom position correction process C and causes the step to transition to step S501 (see FIG. 10). Then, when the boom position correction process C ends, the step transitions to step S132 (see FIG. 7).

In step S132, the control system 34 generates the corrected feed-forward operating signal AMd2 from the target position coordinate q(n+1), and causes the step to transition to step S150.

In step S150, the control system 34 adds the feedback operating signal AMd1 and the feed-forward operating signal AMd2, and causes the step to transition to step S160.

In step S160, the control system 34 transmits a signal (also referred to as a final operating signal) obtained by adding the feedback operating signal AMd1 and the feedforward operating signal AMd2 to each actuator of the crane 1, and causes the step to transition to step S100.

As illustrated in FIG. 8, the control system 34 acquires the target moving speed signal Vd of the load W in step S101 of the target course calculation process A. The target moving speed signal Vd of the load N is a signal input as the operator operates the load moving operation tool 32.

Next, in step S102 of FIG. 8, the control system 34 acquires the target moving position signal Pd of the load W. The target moving position signal Pd of the load W is a signal generated by integrating the target moving speed signals Vd by the integrator 32a.

Next, in step S103 of FIG. 8, the control system 34 acquires the target course signal Pdα. The target course signal Pdα is a signal calculated by filtering the target moving position signal Pd by the target value filter 35. Then, the control system 34 ends the target course calculation process A and causes the step to transition to step S200 (see FIG. 9).

As illustrated in FIG. 9, in steps S201 and S401 of the boom position calculation process B, the control system 34 causes the target operating amount calculation unit 36 to calculate the current position coordinate q(n) of the boom 9 from the turning angle θz(n) of the turning base 7, the elongation/contraction length lb(n), and the raising angle θx(n) of the boom 9, and causes the step to transition to steps S202 and S402.

In steps S202 and S402, the control system 34 causes the target operating amount calculation unit 36 to calculate the fed-out amount l(n) of the wire rope from the current position coordinate p(n) of the load W and the current position coordinate q(n) of the boom 9 using the above Formula (4), and causes the step to transition to steps S203 and S403.

In steps S203 and S403, the control system 34 causes the target operating amount calculation unit 36 to calculate the target position coordinate p(n+1) of the load W, which is the target position of the load W after the lapse of the unit time t from the target course signal Pdα, with the current position coordinate p(n) of the load W as the reference, and causes the step to transition to steps S204 and S404.

In steps S204 and S404, the control system 34 causes the target operating amount calculation unit 36 to calculate the acceleration of the load W from the current position coordinate p(n) of the load W and the target position coordinate p(n+1) of the load W, calculates the direction vector e(n+1) of the ire rope using the gravitational acceleration and the above Formula (5), and causes the step to transition to steps S205 and S405.

In steps S205 and S405, the control system 34 causes the target operating amount calculation unit 36 to calculate the target position coordinate q(n+1) of the boom 9 from the calculated wire rope fed-out amount l(n) and direction vector e(n+1) of the wire rope using the above Formula (6), ends the boom position calculation process B, and causes the step to transition to step S300 or step S500 (see FIG. 10).

As illustrated FIG. 10, in steps S301 and S501 of the boom position correction process C, the control system 34 causes the deflection angle calculation unit 37 to calculate the radial angle β(n) that is an angle formed by the direction vector e(n) with respect to the axis of the boom 9 from the tension f(n) of the wire rope and the direction vector e(n), which is a direction of the wire rope, and the circumferential angle γ(n) that is an angle of the boom 9 in the turning direction formed by the direction vector e(n) with respect to the vertical line, and causes the step to transition to steps S302 and S502.

In steps S302 and S502, the control system 34 causes the deflection angle calculation unit 37 to calculate the raising-direction component force fβ(n) of the tension f(n) from the tension f(n) of the wire rope and the radial angle β(n) and calculate the turning-direction component force fγ(n) of the tension f(n) from the tension f(n) of the wire rope and the circumferential angle γ(n), and causes the step to transition to steps S303 and S503.

In steps S303 and S503, the control system 34 causes the deflection angle calculation unit 37 to calculate the deflection angle δ(n) of the boom 9 in the vertical direction from the raising-direction component force fβ(n) of the tension f(n) using the above Formula (7) and calculate the deflection angle ε(n) in the turning direction of the boom 9 from the turning-direction component force fγ(n) of the tension f(n) using the above Formula (8). Then, the control system 34 transmits the deflection angle δ(n) in the vertical direction and the deflection angle ε(n) in the turning direction to the target operating amount calculation unit 36, and causes the steps to proceed to steps S304 and S504.

In steps S304 and S504, the control system 34 causes the target operating amount calculation unit 36 to correct the current position coordinate q(n) of the boom 9 and the target position coordinate q(n+1) of the boom 9 on the basis of the deflection angle δ(n) in the vertical direction and the deflection angle ε(n) in the turning direction of the boom 9, ends the boom position correction process C, and causes the step to transition to steps S110 and S132 (see FIG. 7). The current position coordinate q(n) of the boom 9 and the target position coordinate q(n+1) of the boom 9 correspond to examples of the intermediate information generated in the process of generating the signal related to the target operating amount (corrected target operating signal AMd).

The control system 34 of the crane 1 repeats the target course calculation process A and the boom position calculation process B to calculate the target position coordinate q(n+1) of the boom 9 and calculate the direction vector e(n+2) of the wire rope on the basis of the fed-out amount l(n+1) of the wire rope, the current position coordinate p(n+1) of the load W, and the target position coordinate p(n+2) of the load W after the lapse of the unit time t.

In addition, the control system 34 further calculates the target position coordinate q(n+2) of the boom 9 after the lapse of the unit time t on the basis of the fed-out amount l(n+1) of the wire rope and the direction vector e(n+2) of the wire rope.

That is, the control system 34 calculates the direction vector e(n) of the wire rope, and uses the inverse dynamics to sequentially calculate the target position coordinate q(n+2) of the boom 9 after the lapse of the unit time t on the basis of the current position coordinate p(n+1) of the load W, the target position coordinate p(n+2) of the load W, and the direction vector e(n+2) of the wire rope.

The control system 34 generates the corrected target operating signal AMd on the basis of the target position coordinate q(n+2) of the boom 9 and controls each actuator.

The learning-type inverse dynamics model 40 of the control system 34 includes the plurality of subsystems having apparent physical characteristics. In addition, the learning-type inverse dynamics model 40 can be regarded as a one-layer neural network by multiplying outputs from the plurality of subsystems by respective weighting factors.

The learning-type inverse dynamics model 40 can make physical characteristics of the first subsystem SM1, the second subsystem SM2, the third subsystem SM3, ..., and the nth subsystem SMn to be approximated to the characteristics of the crane 1 by adjusting the weighting factors $w_1$, $w_2$, $w_3$, ..., and $w_n$ independently on the basis of the difference between the target operating signal Md (corrected target operating signal AMd) and the actual operating signal Mdr.

In addition, the control system 34 of the crane 1 corrects the current position coordinate q(n) of the boom 9 and the target position coordinate (n+1) of the boom 9 on the basis of the information related to the deflection of the crane 1 in the boom position correction process C, thereby generating the corrected target operating signal AMd of each actuator of the crane in consideration of the deflection of the boom 9. As a result, the control system 34 of the crane 1 can suppress the influence of the deflection of the boom 9 that changes depending on the elongation/contraction length of the boom 9. The information related to the deflection of the crane 1 may include the information related to the deflection of the vehicle body of the crane 1 together with the information related to the deflection angle of the boom 9.

In this manner, the control system 34 of the crane 1 identifies the weighting factors $w_1$, $w_2$, $w_3$, ..., and $w_n$ of the learning-type inverse dynamics model 40 while considering the deflection of the boom 9 and flexibly responding to changes in dynamic characteristics thereof during the operation of the crane 1.

That is, in the control system 34, a high-order transfer function is adjusted for each of the plurality of low-order subsystems, namely, first subsystem SM1, second subsystem SM2, third subsystem SM3, ..., and nth subsystem SMn.

In addition, the control system 34 takes into account the amount of elastic deformation (the information related to the deflection) of the boom 9 that is not calculable by the learning-type inverse dynamics model 40, and thus, a calculation accuracy of the target position coordinate g(n+1) of the boom 9 is improved.

As a result, when the actuator is controlled with the load W as a reference, the control system 34 can move the load W in a mode according to the operator's intention while suppressing the swinging of the load W by learning the dynamic characteristics of the crane 1 in consideration of the deflection of the boom 9 from the motion of the load W.

Note that the control system 34 includes the learning-type inverse dynamics model 40 as the plurality of subsystems in the present embodiment, but any other model with apparent physical characteristics may be included.

In addition, the corrected target operating signal AMd input to the learning-type inverse dynamics model 40 is generated on the basis of the target course signal $Pd\alpha$ filtered by the target value filter 35 that is the low-pass filter, and thus, the generation of the singular point in the differential operation in the feed-forward control unit 41 is suppressed in the control system 34. Therefore, convergence of learning of the learning-type inverse dynamics model 40 in the control system 34 is promoted.

As a result, when the actuator is controlled with the load W as the reference, the control system 34 can move the load W in the mode according to the operator's intention while suppressing the swinging of the load W.

The above-described embodiment merely illustrates a typical form, and various modifications can be implemented within a scope not departing from a gist of the embodiment. Needless to say, the present invention can be implemented in various forms, and the scope of the present invention encompasses those illustrated in the description of the claims, those having meanings equivalent to those in the claims, and all alterations within the scope.

REFERENCE SIGNS LIST 1 crane
2 vehicle
3 wheel
4 engine
5 outrigger
6 crane device
7 turning base
7b turning base camera
8 turning hydraulic motor
9 boom
9a jib
9b boom camera
10 main hook block
10a main hook
11 sub hook block
11a sub hook
12 raising hydraulic cylinder
13 main winch
14 main wire rope
15 sub winch
16 sub wire rope
17 cabin
18 turning operation tool
19 raising operation tool
20 elongation/contraction operation tool
21m main drum operation tool
21s sub drum operation tool
23 turning valve
24 elongation/contraction valve
25 raising valve
26m main valve
26s sub valve
27 turning sensor
28 elongation/contraction sensor
29 azimuth sensor
30 raising sensor
31 control device
31a target course calculation unit
31b boom position calculation unit
31c operating signal generation unit
32 load moving operation tool
32a integrator
33 winding sensor
34 control system
35 target value filter
36 target operating amount calculation unit
37 deflection angle calculation unit
38 feedback control unit
39 feedback controller
40 learning-type inverse dynamics model
41 feed-forward control unit
42 load detection unit
W load
Vd target moving speed signal
Pd target moving position signal
$Pd_\alpha$ target course signal
$w_1$, $w_2$, $w_3$, $w_4$ weighting factor

The invention claimed is:
1. A work machine control system that controls an actuator of a work machine having a boom, the work machine control system comprising:

circuitry configured to generate a signal related to a target operating amount of the actuator from an input signal;

control the actuator based on a difference between the signal related to the target operating amount and a signal related to a fed-back operating amount of the actuator;

control the actuator based on the signal related to the target operating amount in cooperation with the control based on the difference, and learn characteristics of the actuator by adjusting a weighting factor based on a teacher signal; and calculate information related to a deflection angle of the boom, wherein the information related to a deflection angle of the boom includes information related to a deflection angle of the boom in a vertical direction and information related to a deflection angle of the boom in a turning direction, and the circuitry is further configured to:

calculate the information related to the deflection angle of the boom in a vertical direction and the information related to a deflection angle of the boom in a turning direction based on an attitude information of the boom, a tension of a wire rope supported by the boom, and a direction vector showing a direction of the wire rope; and correct intermediate information, which is generated in a process of generating the signal related to the target operating amount, based on the information related to the deflection angle of the boom in a vertical direction and the information related to a deflection angle of the boom in a turning direction obtained from the calculation, and generate the signal related to the target operating amount.

2. The work machine control system according to claim 1, wherein the circuitry is further configured to remove a pulse-shaped component from the input signal in the process of generating the signal related to the target operating amount.

3. The work machine control system according to claim 1, wherein the circuitry is further configured to generate a signal related to a target moving position of a load from a signal related to a target speed of the load carried by the work machine, the signal related to the target moving position of the load being the input signal and having a pulse-shaped component.

4. The work machine control system according to claim 1, wherein the circuitry is further configured to:

attenuate a frequency component equal to or higher than a predetermined frequency from the input signal and generates a signal related to a target course of a load carried by the work machine;

generate the signal related to the target operating amount based on the signal related to the target course; and correct the intermediate information based on the information related to the deflection angle of the boom in a vertical direction and the information related to a deflection angle of the boom in a turning direction in the process of generating the signal related to the target operating amount.

5. A crane, which is the work machine, equipped with the work machine control system according to claim 1.

* * * * *